Oct. 16, 1951  S. L. BRADLEY  2,571,827
REGULATING SYSTEM
Filed May 20, 1950

WITNESSES:

INVENTOR
Schuyler LeRoy Bradley.
BY
ATTORNEY

Patented Oct. 16, 1951

2,571,827

UNITED STATES PATENT OFFICE 2,571,827

REGULATING SYSTEM

Schuyler L. Bradley, Pittsburgh, Pa., assignor to Westinghouse Electric Corporation, East Pittsburgh, Pa., a corporation of Pennsylvania Application May 20, 1950, Serial No. 163,238

9 Claims. (Cl. 322—25)

1

This invention relates to regulating systems and in particular to regulating systems of static components.

Regulating systems for generators as generally employed heretofore utilized exciters of the rotating type or of the electron tube type. Both of these known types have inherent disadvantages. For example, the rotating exciter has a commutator with its commutation troubles and brush replacement requirements, whereas the electron tube type cannot be built satisfactorily for high shock or impact duty and requires frequent replacement of the tubes.

An object of this invention is to provide a regulating system having static components for controlling the operation of a generator.

Another object of this invention is to provide a regulating system for a generator in which a static exciter is provided for operation under predetermined conditions to control the excitation of the generator.

A further object of this invention is to provide a regulating system for a generator in which a static exciter is utilized, the static exciter being selectively controlled from a separate source of direct current or from a static network regulator connected to be responsive to directional deviations of an electric quantity of the generator from a predetermined value.

Figure 1:
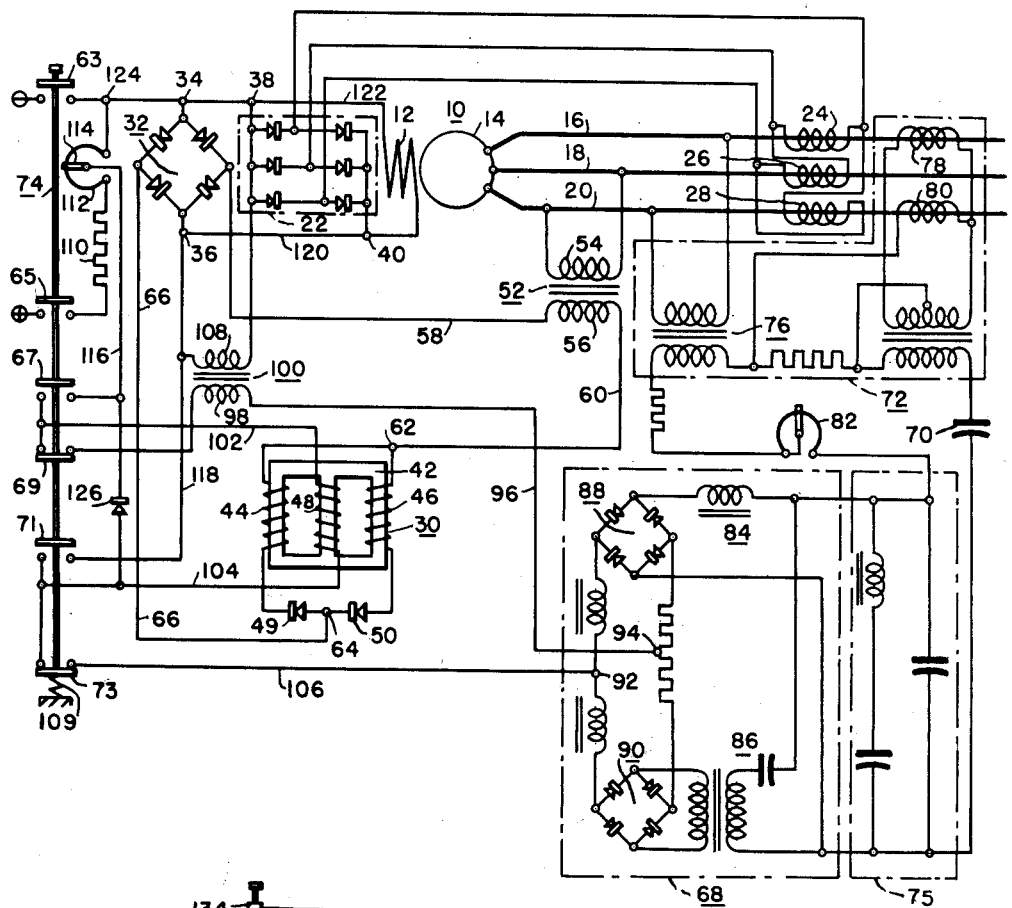
Figure 2:
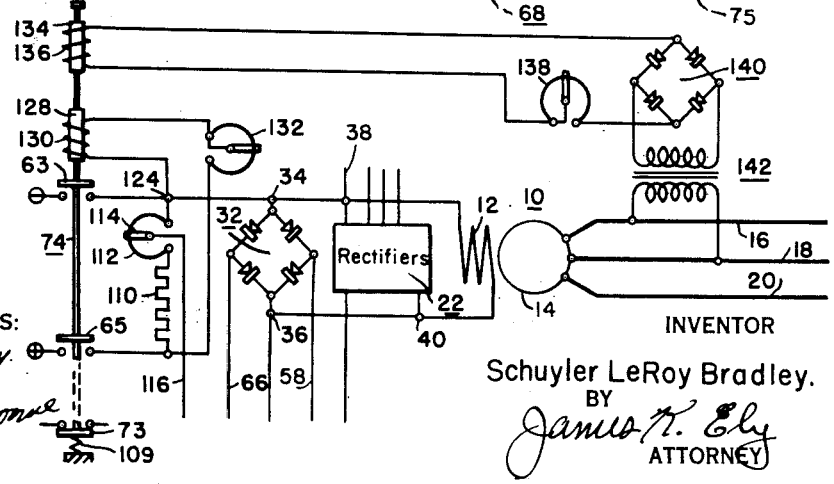

Other objects of this invention will become apparent from the following description when taken in conjunction with the accompanying drawing, in which:

Figure 1 is a diagrammatic view of apparatus and circuits embodying this invention; and Fig. 2 is a diagrammatic view of a part of the system illustrating another embodiment of the control unit utilized in Fig. 1.

Referring to Fig. 1 of the drawing, this invention is illustrated by reference to a generator 10 having a field winding 12 and an armature winding 14 connected to a three-phase load circuit comprising conductors 16, 18 and 20. The generator 10 is disposed to be driven by any suitable prime mover (not shown).

In order to provide substantially all of the excitation of the generator 10 under normal load conditions, as will be explained more fully hereinafter, three-phase dry type rectifiers 22 are connected across the field winding 12, being disposed to be supplied by the current transformers 24, 26 and 28 disposed in inductive relation with the conductors 16, 18 and 20, respectively, whereby the field winding 12 is energized in accordance with the flow of current in the load circuit.

In order to provide excitation for the generator 10 under starting and no load conditions and to control the excitation of the generator 10 under load conditions, a self-saturating reactor 30 of the type now commonly known as a magnetic amplifier is disposed to control the output of a single-phase full-wave rectifier 32, the output terminals 34 and 36 of which are connected across the field winding 12 and the output terminals 38 and 40, respectively, of the three-phase rectifier 22 to connect the rectifiers 22 and 32 in parallel circuit relation.

In this embodiment, the self-saturating reactor 30 comprises the three-legged magnetic core structure 42, a pair of alternating-current windings 44 and 46 disposed on the outer legs of the core structure or member 42 and connected in parallel circuit relation with one another and a direct-current control winding 48 disposed on the central leg of the core member 42. A pair of rectifiers 49 and 50 are so disposed and connected in the parallel circuit of the alternating-current windings 44 and 46, respectively, that opposite half cycles of alternating-current will selectively traverse one of the windings 44 and 46.

In order to provide a source of alternating-current for the windings 44 and 46, a potential transformer 52 is disposed with its primary windings 54 connected across the load conductors 18 and 20 and its secondary windings 56 connected in circuit with the full-wave rectifier 32 and the alternating-current windings 44 and 46 of the reactor 30. Thus one terminal of the secondary winding 56 of the transformer 52 is connected by conductor 58 to an input terminal of the full-wave rectifier 32, the other terminal of the secondary winding 56 being connected by conductor 60 to the common junction 62 of the parallel connected windings 44 and 46 of the reactor 30, through the windings and rectifiers 48 and 50 to the other common junction 64 and from thence through conductor 66 to the other input terminal of the full-wave rectifier 32.

The direct-current control winding 48 of the reactor 30 is disposed to be selectively connected, as will be explained more fully hereinafter, to either a separate source of direct-current energy represented by the positive and negative signs or to the output terminals of a static voltage regulating network 68 which is connected through a harmonic filter 75, a frequency compensating capacitor 70 to be supplied by the line voltage, a network 72 being utilized to derive a positive sequence component of the line voltage for supplying a measure of the line voltage. In order to selectively control the source of energization of the direct-current winding 48, a push switch 74 having bridging contact members 63, 65, 67, 69, 71 and 73 is disposed for operation, as will be explained more fully hereinafter.

The network 72 for deriving the positive sequence component of the line voltage is well known and may be of any of the embodiments disclosed and claimed in Patent No. 2,426,018, issued August 19, 1947 to E. L. Harder and assigned to the assignee of this application. Briefly, the network comprises the potential transformer 76 for deriving a single phase of the three-phase line voltage having no zero-sequence voltage-component and current transformers 78 and 80 which cause line current to pass through the impedance in the network in such a manner as to produce a voltage drop substantially corresponding to the negative-sequence line-voltage, and the voltage drop thus resulting is subtracted from the single phase of the line voltage to produce substantially the positive-sequence component of the line voltage.

An adjustable resistor 82 is connected in the output circuit from the network 72 for providing a voltage adjusting means. The frequency compensating mechanism 70 may be any suitable arrangement of capacitors and inductance devices for the purpose of compensating for frequency. In some cases the frequency of the line voltage will not fluctuate greatly, and it will not be necessary to include the frequency compensating capacitor 70 and the harmonic filter 75, in which case the positive-sequence component of the line voltage from the network 72 will be supplied directly to the voltage regulating network 68.

The voltage regulating network 68 is of the type disclosed and claimed in Patent No. 2,428,566 issued October 7, 1947 to Harder et al. which is assigned to the assignee of this invention, and comprises in general, a non-linear impedance circuit 84 and a linear impedance circuit 86 connected to be simultaneously energized in accordance with the line voltage and, in this instance, by the positive-sequence component of the load circuit. The non-linear impedance circuit 84 and the linear impedance circuit 86 are connected across dry-type rectifying units 88 and 90, respectively, the output terminals of the rectifying units being connected in series circuit relation with each other through suitable series connected smoothing reactors and a resistor. The elements of the non-linear impedance circuit 84 and of the linear impedance circuit 86 have intersecting impedance characteristics and for a given line voltage the output terminals 92 and 94 of the direct-current series circuit of the rectifying units 88 and 90 will be at zero potential. As the line voltage fluctuates from the given value, the current drawn by the circuits 84 and 86 varies with the result that an unbalanced condition occurs between the rectifying units 88 and 90 to vary the potential and polarity at the terminals 92 and 94.

In normal operation of the system under load conditions, the output terminals 92 and 94 of the voltage regulating network 68 are connected in circuit with the direct-current control winding 48 of the reactor 30 through a circuit which extends from terminal 94 through conductor 96, the secondary winding 98 of a damping transformer 100, bridging contact member 69, conductor 102, the control winding 48, conductor 104, bridging contact member 73 and conductor 106 to the terminal 92. The primary winding 108 of the damping transformer 100 is connected across the field winding 12, whereby a measure of the rate of change of the energization of the field winding 12 is impressed on the control circuit to prevent hunting.

As stated hereinbefore, the push switch 74 is disposed to selectively connect the direct-current winding 48 to either the network 68 or to a separate source of direct-current energy. Thus in starting the system, the switch 74 is manually operated against the biasing spring 109, to actuate the bridging contact members 69 and 73 to a circuit interrupting position to disconnect the network 68 from the control winding 48 of the reactor 30 and simultaneously therewith actuate bridging contact members 63, 65, 67 and 71 to a circuit closing position.

As illustrated, when the switch 74 is thus operated, the separate source of direct-current represented by the positive and negative symbols is connected by bridging contact members 63 and 65 across a series connected fixed resistor 110 and an adjustable resistor 112 to impress a potential thereacross. The control winding 48 is thus connected in an energizing circuit for the field winding 12 which extends from the adjustable tap 114 of resistor 112 through conductor 116, contact member 67, conductor 102, direct-current control winding 48 of the reactor 30, conductor 104, contact member 71, conductors 118 and 120, field winding 12 and conductor 122 to the terminal 124 at the end of the series connected resistors 110 and 112.

The field winding 12 is thus energized to immediately excite the generator 10 to bring the voltage thereof up towards normal voltage. As will be appreciated, when the operation of the system is thus first initiated, the reactor 30 has substantially no effect on the excitation of the field winding 12, since very little voltage is impressed on the transformer 52. The excitation of the generator 10 is, therefore, manually controlled by adjusting the adjustable tap 114 of the resistor 112. The flow of the direct-current through the winding 48 tends to saturate the core of the reactor 30, so that as the voltage of the generator 10 builds up, opposite half cycles of the alternating-current from the potential transformer 52 passes through the windings 44 and 46 to the full-wave rectifier 32, the output terminals of which are connected across the field winding 12 to tend to increase the energization thereof. This action is continued until the push switch 74 is moved to actuate the contact members 63, 65, 67 and 71 to a circuit opening position to disconnect the manual control and to actuate the contact members 69 and 73 to a circuit closing position to connect the automatic voltage regulating network 68 to control the operation of the system.

However, if before the push switch 74 is operated to condition the system for automatic control, if the generator 10 is connected to a load and load current flows through conductors 16, 18 and 20, the current transformers 24, 26 and 28 are energized and current flows from the output terminal 40 of the three-phase rectifiers 22 through the field winding 12 to the other terminal 38 of the three-phase rectifier 22 to energize the field winding 12 in accordance with the load current. Under load conditions, the three-phase rectifiers 22 supply substantially all of the excitation of the generator 10 above the no load excitation which later excitation is normally supplied by the full wave rectifier 32.

Under such operating conditions, when the potential across the terminals 40 and 38 of the three-phase rectifiers 22 exceeds the potential across the series-connected resistors 112 and 110 of the manual control, provision is made to bleed off the excess current from the rectifier 22 so that it will not affect the direct-current winding 48 of the reactor 30. Thus a dry type rectifier 126 is connected between conductors 104 and 116 to provide a bleeding circuit which extends from the terminal 40 of the rectifier 22 through conductors 120 and 118, contact member 71, conductor 104, rectifier 126 and conductor 116 to the adjustable tap 114 of the resistor 112.

The switch over from manual control to automatic control may be at any point after the initial build up of generator voltage. Assuming that the switch over is at normal generator voltage under a load condition and that resistor 82 has been adjusted for that particular voltage, the rectifier 22 is sufficient for normally maintaining the excitation of generator 10 to provide substantially constant voltage on the conductors 16, 18 and 20. Under such conditions, the positive sequence network 72 functions to deliver a positive-sequence component of the generator voltage to the frequency compensator 70 and from thence to the voltage regulating network 68. The non-linear and linear impedance circuits 84 and 86, respectively, are so selected that when the predetermined normal line voltage component is impressed thereon, the circuits 84 and 86 have intersecting impedance characteristics and the voltage across the rectifying units 88 and 90 and at the terminals 92 and 94 are equal and so balanced that a voltage drop does not appear across the control winding 48 of the reactor 30.

Under such conditions, where no direct current is passed through the control winding 48 of the reactor 30, the flux created in the magnetic core of the reactor 30 will be that occasioned by the alternating-current windings 44 and 46. Since the flux developed by these windings is always in the same direction, the voltage impressed on the full-wave rectifier 32, to control the energization of the control field winding 12 is such as to be about half way between the minimum and maximum voltage possible by controlling the energization of the direct-current winding 48.

If the load changes so that the line voltage should increase from the predetermined value, then the positive sequence component delivered to the network 68 is increased, with the result that the non-linear impedance circuit 84 draws more current than the linear impedance circuit 86 and the output voltages across the rectifying units 88 and 90 are unbalanced. With such an unbalanced condition, the larger potential across the rectifying unit 88 causes current to flow in the circuit extending from terminal 92 through conductor 106, contact member 73, conductor 104, control winding 48, conductor 102, contact member 69, secondary winding 98 of damping transformer 100 and conductor 96 to the terminal 94. With current flowing in the control winding 48 of the reactor 30 in this manner, a flux is created which opposes the flux due to the alternating-current windings 44 and 46 to reduce the total average flux of the core of the reactor 30 and thereby reduce the voltage impressed on the full-wave rectifier 32. The decrease in the output of the rectifier 32 cooperates with the output of the three-phase rectifiers 22 to effect a decrease in the energization of the field winding 12 and consequently effect a reduction of the line voltage to the predetermined value which is to be maintained.

If the change in the line voltage should be a decrease from the predetermined value, then the linear impedance circuit 86 draws more current than the non-linear impedance circuit 84 with the result that current flows from the terminal 94 through conductor 96, secondary winding 98 of damping transformer 100, contact member 69, conductor 102, control winding 48, conductor 104, contact member 73, and conductor 106 to the terminal 92. When current flows in this direction in the control winding 48, a flux is developed in the reactor core which is cumulative with the flux developed by the alternating-current windings 44 and 46 to increase the total magnetization of the core member and thereby increase the voltage impressed on the full-wave rectifier 32. The increase in the output of the rectifier 32 is cumulative to the output of the three-phase rectifiers 22 to effectively increase the excitation of the generator 10 to increase the line voltage to the predetermined value which is to be maintained.

Instead of the manual operation of the push switch 74 as described with reference to Fig. 1, which operation is desired for shock-proof applications as on board ships, an automatic operation of the switch 74 may be had as illustrated in the partial showing of the system made in Fig. 2. In this embodiment, the switch 74 is provided with a solenoid 128, the energizing winding 130 of which is connected in a holding circuit across the series connected resistors 110 and 112 and the terminal 124, and adjustable resistor 132 being provided in the holding circuit for adjusting the energization of the winding 130. The energization of winding 130 is preferably adjusted to just overcome the force of the spring 109 to maintain the switch 74 in manual control position. Thus when the switch 74 is manually operated to place the system in operation for manual control, the winding 130 is sufficiently energized to maintain the switch in that position pending automatic control.

In order to make the transfer of the switching fully automatic to thereafter control the system automatically, another solenoid 134 is provided on the switch 74. The solenoid 134 has an energizing winding 136 connected through an adjustable resistor 138 and a rectifier 140 to be energized from a potential transformer 142 connected across the load conductors 16 and 18. The resistor 138 is so adjusted that for any predetermined voltage at which it is desired to switch from manual operation to automatic operation, the winding 136 is energized sufficiently to overcome the effect of solenoid 128 to actuate the push switch 74 to the automatic switching position. This automatic switch-over may be at any line voltage of from 50% normal voltage, upwardly.

The system described gives a very close control of the line voltage either on manual control or on the automatic control. As is evident when the switch 74 is in the manual control position, the current flow through the control winding 48 and the field winding 12 is in the direction to increase the output of the self-saturating reactor 30 and to increase the alternating-current output voltage of the generator 10. When the generator voltage rises, the voltage impressed on the potential transformer 52 increases to increase the output of the reactor 30 and thus, in turn, cause a further increase in the excitation of the generator 10. This action continues until the voltage across the generator field winding 12 equals the potential across the section of the adjustable resistor 112 of the manual control unit. By adjusting the adjustable resistor 112 of the manual control unit, the excitation voltage of the generator 10 can thus be controlled from near zero to the maximum required. The manual control unit thus insures voltage build-up on the generator 10 for current can be thus supplied to the generator field winding 12 on manual control which will be of sufficient magnitude to always start voltage build-up.

When the system is connected for automatic control, as described hereinbefore, a very sensitive regulation is obtained, it being noted that by reason of the inclusion of the damping transformer 100, a rate of change of changes in the field energization is impressed on the circuit for the control winding 48 to thereby prevent hunting. The system is constructed of standard component parts and can be readily reproduced by one skilled in the art.

I claim as my invention:

1. In a regulating system for a generator having a field winding and disposed to supply a three-phase load circuit, the combination comprising, current transformers disposed to be energized in response to the flow of current in the load circuit, three-phase dry type rectifiers connected in circuit relation between the current transformers and the field winding to energize the field winding in accordance with the load supplied, a full-wave rectifier connected in parallel circuit relation with the three-phase rectifiers to supply the field winding, a source of alternating-current potential, a self-saturating reactor having alternating-current windings and a direct-current control winding, the alternating-current windings being connected in circuit relation between the source of alternating-current potential and the full-wave rectifier, a source of direct-current energy, a static network connected to the load circuit and disposed to have a directional direct-current output in accordance with a departure of an electrical quantity of the load circuit from a predetermined value, and switching means disposed to be operated to selectively connect the direct-current control winding of the reactor to said source of direct-current energy or the direct-current output of the static network.

2. In a regulating system for a generator having a field winding and disposed to supply a load circuit, the combination comprising, current transformers disposed to be energized in response to the flow of current in the load conductors, rectifiers connected in circuit relation between the current transformers and the field winding to energize the field winding in accordance with the load supplied, a full-wave rectifier connected in parallel circuit relation with the current transformer rectifiers to supply the field winding, a potential transformer connected to be supplied from the load circuit, a self-saturating reactor having alternating-current windings and a direct-current control winding, the alternating-current windings being connected in circuit relation between the potential transformer and the full-wave rectifier, and means connecting the direct-current control winding of the reactor to the load circuit to directionally control the energization thereof in accordance with the departure of an electrical quantity of the load circuit from a predetermined value.

3. In a regulating system for a generator having a field winding and disposed to supply a three-phase load circuit, the combination comprising, current transformers inductively disposed with the three-phase load circuit to be energized in response to the flow of current therein, three-phase dry type rectifiers connected in circuit relation between the current transformers and the field winding to energize the field winding in accordance with the load supplied, a full-wave dry type rectifier connected in parallel circuit relation with the three-phase rectifiers to supply the field winding, a potential transformer connected to be supplied from the load circuit, a self-saturating reactor having alternating-current windings and a direct-current control winding, the alternating-current windings being connected in circuit relation between the potential transformer and the full-wave rectifier, and a static network connected to the direct-current control winding of the reactor disposed to directionally control the energization thereof in accordance with a departure of an electrical quantity of the load circuit from a predetermined value.

4. In a regulating system for a generator having a field winding and disposed to supply a load circuit, the combination comprising, a full-wave rectifier connected to supply the field winding, a source of alternating-current potential constituting a measure of the generator voltage, a self-saturating reactor having alternating-current windings and a direct-current control winding, the alternating-current windings being connected in circuit relation between the alternating-current potential and the full-wave rectifier, means disposed to connect the direct-current control winding to a source of direct-current energy and in series circuit relation with the field winding, and adjustable resistor means connected in circuit with the control winding when the control winding is connected to the source of direct-current energy disposed to be adjusted to control the saturation of the reactor and the energization of the field winding to effect a build up of voltage of the generator, the alternating-current potential constituting a measure of the generator voltage being impressed across the full-wave rectifier when the reactor is saturated to aid in energizing the field winding a predetermined amount equal to a predetermined value determined by the adjustment of the adjustable resistor.

5. In a regulating system for a generator having a field winding and disposed to supply a load circuit, the combination comprising, current transformers disposed to be energized in response to the flow of current in the load conductors, dry type rectifiers connected in circuit relation between the current transformers and the field winding to energize the field winding in accordance with the load supplied, a full-wave rectifier connected in parallel circuit relation with the dry type rectifiers to supply the field winding, a source of alternating-current potential, a self-saturating reactor having alternating-current windings and a direct-current control winding, the alternating-current windings being connected in circuit relation between the source of alternating-current potential and the full-wave rectifier, means disposed to connect the direct-current control winding to a source of direct-current energy and in series circuit relation with the field winding, and means connected in circuit with the control winding when connected to said source of direct-current energy disposed to be operated to control the energization of the direct current control winding and of the field winding.

6. In a regulating system for a generator having a field winding and disposed to supply a load circuit, the combination comprising, current transformers disposed to be energized in response to the flow of current in the load conductors, dry type rectifiers connected in circuit relation between the current transformers and the field winding to energize the field winding in accordance with the load supplied, a full-wave rectifier connected in parallel circuit relation with the dry type rectifiers to supply the field winding, a source of alternating-current potential, a self-saturating reactor having alternating-current windings and a direct-current control winding, the alternating-current windings being connected in circuit relation between the source of alternating-current potential and the full-wave rectifier, means disposed to connect the direct-current control winding to a source of direct-current energy and in series circuit relation with the field winding, manually operable means connected in circuit with the control winding when the control winding is connected to said source of direct current disposed for operation to control the energization of the control winding and the field winding, the energization of the control winding controlling the saturation of the reactor to control the output of the full-wave rectifier, and a dry type rectifier having non-linear resistance characteristic connected in circuit relation between the parallel connected rectifiers and the manually operable means to effectively bleed off current from the current rectifiers when the voltage across the current rectifiers exceeds the voltage across the manually operable means to thereby limit the flow of said current through the direct-current control winding of the reactor.

7. In a regulating system for a generator having a field winding and disposed to supply a three-phase load circuit, the combination comprising, current transformers disposed to be energized in response to the flow of current in the load circuit, three-phase dry type rectifiers connected in circuit relation between the current transformers and the field winding to energize the field winding in accordance with the load supplied, a full-wave rectifier connected in parallel circuit relation with the three-phase rectifiers to supply the field winding, a source of alternating-current potential, a self-saturating reactor having alternating-current windings and a direct-current control winding, the alternating-current windings being connected in circuit relation between the source of alternating-current potential and the full-wave rectifier, a source of direct-current energy, a static network connected to the load circuit and disposed to have a directional direct-current output in accordance with a departure of an electrical quantity of the load circuit from a predetermined value, means disposed to be operated to selectively connect the direct-current control winding of the reactor to said source of direct-current energy or to the direct-current output of the static network, said selective operative means also connecting the control winding in series with the field winding when operated to connect the control winding to said source of direct current energy, and resistor means connected in circuit relation with the direct-current control winding when the winding is selectively connected to said source of direct-current energy disposed to be manually adjusted to control the energization of the direct-current control winding and the energization of the field winding.

8. In a regulating system for a generator having a field winding and disposed to supply a three-phase load circuit, the combination comprising, current transformers disposed to be energized in response to the flow of current in the load circuit, three-phase dry type rectifiers connected in circuit relation between the current transformers and the field winding to energize the field winding in accordance with the load supplied, a full-wave rectifier connected in parallel circuit relation with the three-phase rectifiers to supply the field winding, a source of alternating-current potential, a self-saturating reactor having alternating-current windings and a direct-current control winding, the alternating current windings being connected in circuit relation between the source of alternating-current potential and the full-wave rectifier, a source of direct-current energy, a static network connected to the load circuit and disposed to have a directional direct-current output in accordance with a departure of an electrical quantity of the load circuit from a predetermined value, means disposed to be operated to selectively connect the direct-current control winding of the reactor to said source of direct-current energy or the direct-current output of the static network, said selective operative means also connecting the control winding in series with the field winding when operated to connect the control winding to said source of direct current energy, resistor means connected in circuit relation with the direct-current control winding when the winding is selectively connected to said source of direct-current energy disposed to be manually adjusted to control the energization of the direct-current control winding and the energization of the field winding, and a dry type rectifier having non-linear resistance characteristics disposed to be connected in circuit relation between the parallel connected rectifiers and said source of direct-current energy when the direct-current control winding is connected thereto to effectively bleed off current from the three-phase rectifiers when the voltage thereacross exceeds the voltage across the manually adjusted resistor means and thereby limit the flow of current from the three-phase rectifiers through the direct-current control winding of the reactor.

9. In a regulating system for a generator having a field winding and disposed to supply a three-phase load circuit, the combination comprising, current transformers disposed to be energized in response to the flow of current in the load circuit, three-phase dry type rectifiers connected in circuit relation between the current transformers and the field winding to energize the field winding in accordance with the load supplied, a full-wave rectifier connected to also supply energy to the field winding, the full-wave rectifier being connected in parallel circuit relation with the three-phase rectifiers, a potential transformer connected to be supplied from the load circuit, a self-saturating reactor having alternating-current windings and a direct-current control winding, the alternating-current windings being connected in circuit relation between the potential transformer and the full-wave rectifier, a source of direct-current energy, a static voltage regulator connected to the load circuit to have a directional direct-current output in accordance with a departure of an electrical quantity of the load circuit from a predetermined value, and switching means disposed to be operated to selectively connect the direct-current control winding of the reactor to the source of direct-current energy or to the direct-current output of the static regulator, said switching means also being disposed to connect the control winding in series with the field winding when operated to connect the control winding to said source of direct-current energy.

SCHUYLER L. BRADLEY.

No references cited.